United States Patent [19]

Kelly

[11] 4,299,641

[45] Nov. 10, 1981

[54] METHOD OF MAKING TWO PLY DUCT CORE

[75] Inventor: Walter F. Kelly, Canton, Conn.

[73] Assignee: The Wiremold Company, West Hartford, Conn.

[21] Appl. No.: 85,804

[22] Filed: Oct. 17, 1979

Related U.S. Application Data

[62] Division of Ser. No. 900,764, Apr. 27, 1978, Pat. No. 4,204,562.

[51] Int. Cl.³ .............................................. B65H 81/00
[52] U.S. Cl. .................................... 156/143; 156/190; 156/195
[58] Field of Search ............... 156/143, 144, 195, 190; 138/122, 129, 133, 134, 138, 153, 150

[56] References Cited

U.S. PATENT DOCUMENTS

| | | | |
|---|---|---|---|
| 3,107,697 | 10/1963 | Daggett et al. | 156/143 X |
| 3,400,029 | 9/1968 | Mesrobian et al. | 156/190 |
| 3,428,093 | 2/1969 | Guiles | 138/132 |
| 3,524,779 | 8/1970 | Masters et al. | 156/195 |
| 3,554,237 | 1/1971 | Pelley | 156/173 |
| 3,563,826 | 2/1971 | O'Neal | 156/195 |
| 3,607,517 | 9/1971 | Pelley | 156/19 |
| 3,846,202 | 11/1974 | Clarke | 156/14 |
| 3,962,019 | 6/1976 | Rejeski | 156/143 |
| 4,104,097 | 8/1978 | Gregory et al. | 156/14 |

FOREIGN PATENT DOCUMENTS 797789 10/1968 Canada ............................... 156/14

*Primary Examiner*—David A. Simmons
*Attorney, Agent, or Firm*—Hayes & Reinsmith

[57] ABSTRACT

A first flexible strip is helically wound with adjacen edges of adjacent wraps in edge lapping relation, forming or reinforcing element such as a wire is heli cally wound in overlying centered relation to lappin; edges of the first strip and a second flexible strip i helically wound about the first strip covering and encas ing the first strip and reinforcing wire, the second stri having adjacent edges of adjacent wraps in lappin, relation symmetrically disposed in staggered relation t the lapping edges of the underlying first strip.

9 Claims, 3 Drawing Figures

METHOD OF MAKING TWO PLY DUCT CORE

This is a division of application Ser. No. 900,764, filed Apr. 27, 1978, now U.S. Pat. No. 4,204,562.

This invention generally concerns wire reinforced flexible duct core and particularly concerns a method for generating such duct.

A primary object of this invention is to provide a new and improved method of making duct core particularly suited for efficient manufacturing processes for forming such a product in a low cost high speed operation.

Another object of this invention is to provide a new and improved method of the type described which features a continuous process for bonding lapping wraps of two different strips of sheet material with the reinforcing wire completely encased between the strips in a helical seam of high integrity extending the length of the duct.

Other objects will be in part obvious and in part pointed out in more detail hereinafter.

A better understanding of the objects, advantages, features, properties and relations of the invention will be obtained from the following detailed description and accompanying drawings which set forth an illustrative embodiment indicative of the ways in which the principles of this invention are employed.

Figure 2:
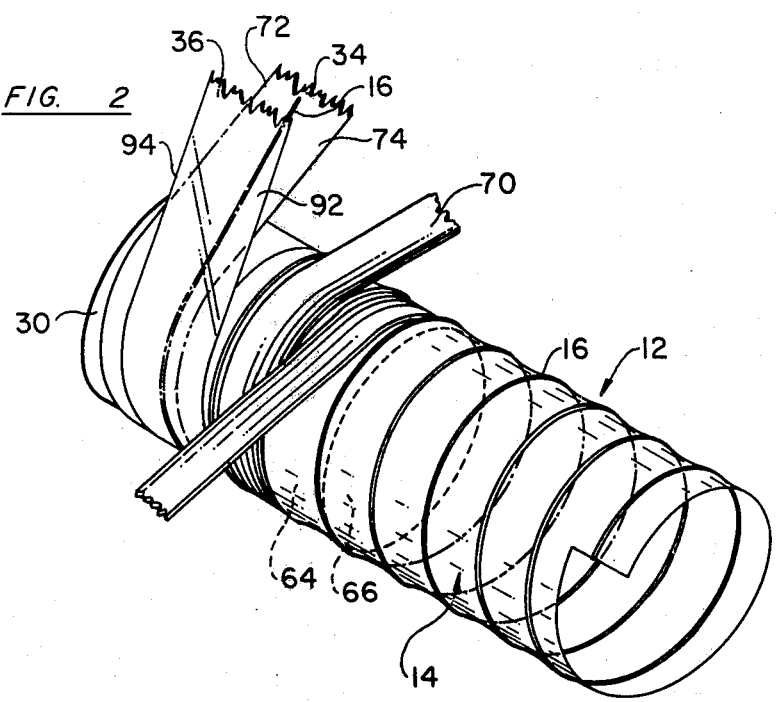
FIG. 2 is an isometric view, partly broken away of the duct core formed by the method of this invention.
Figure 3:
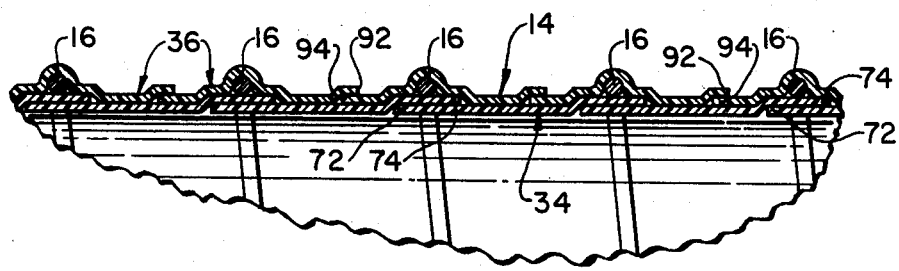
FIG. 3 is an enlarged, fragmentary longitudinal sectional view of the flexiale duct core of this invention.

Referring in detail to the drawings, an apparatus 10 is illustrated which is particularly designed to manufacture tubular duct core 12 (FIGS. 2 and 3) by a continuous method of manufacture according to this invention. As best seen in FIGS. 2 and 3, the duct core 12 comprises flexible sheet or strip material 14 supported by convolutions of helical wire 16 encased within the strip material 14. Duct core 12 itself is useful as a supporting liner, for example, in air conditioning ducts or various heating and ventilation applications and is preferably a soft, thin film impervious to the passage of gas. While a variety of different film materials in strip form may be utilized, including the use of films of different plastic materials, suitable films which have been found to work satisfactorily include polyester films such as duPont 48LBT manufactured by E. I. duPont deNemours and Co., Inc., or 3M 5803 made by Minnesota Mining and Manufacturing Company. The thickness of the film varies, but film of a thickness of about 0.0005 inch has been found to perform satisfactorily.

Rolls 18 and 20 of the film in strip form are illustrated as being rotatably supported on a frame 22 of a payoff and glue station 24 to be fed along a feed path in the directions designated by arrows shown at 26 and 28 to a rotating mandrel 30 at a downstream wrapping station 32.

Figure 1:
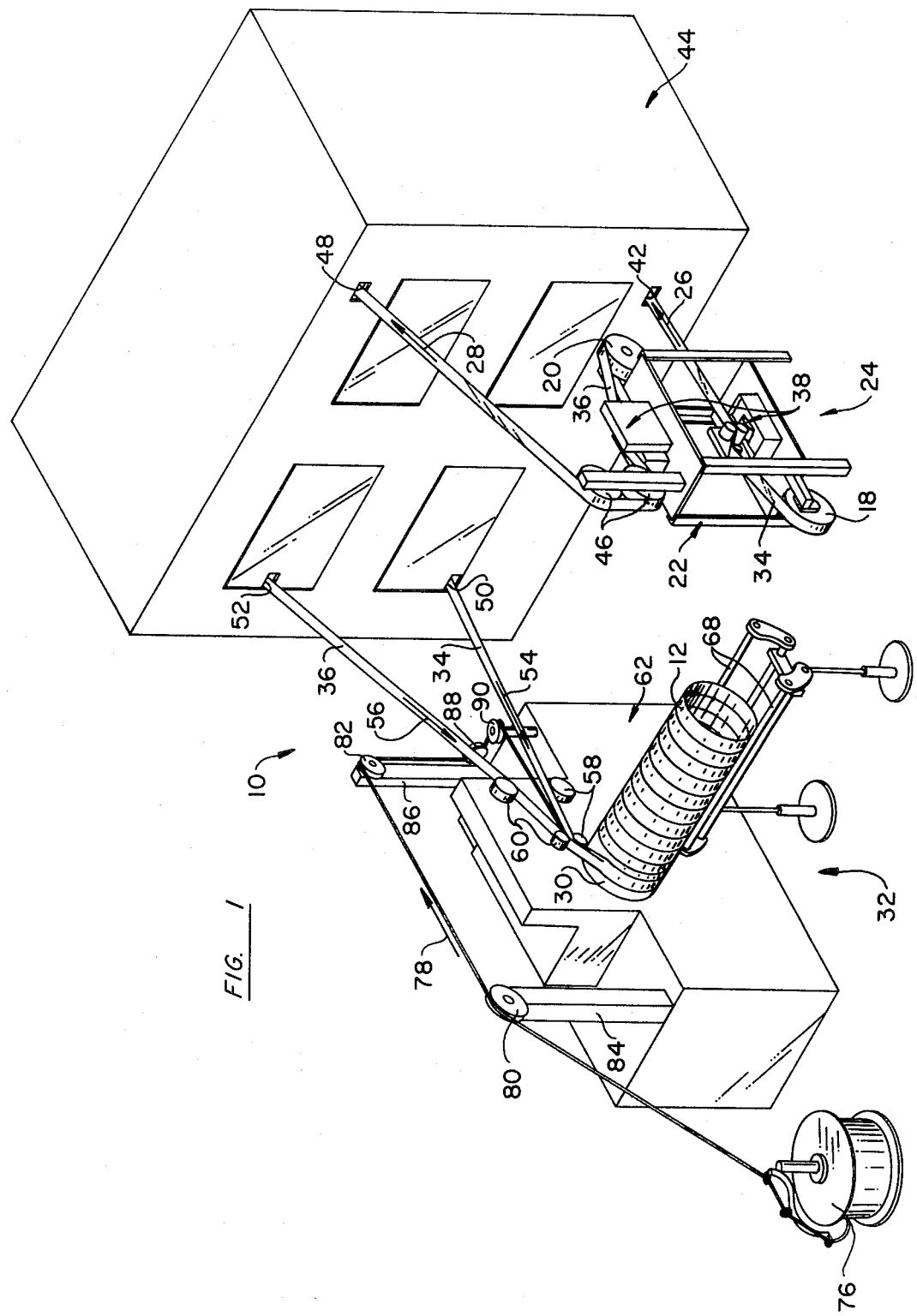
FIG. 1 is a schematic view of a tubular duct core forming apparatus utilized in the method of this invention.

As each film strip 34, 36 is paid-off rolls 18, 20, the film strips 34, 36 are each passed through glue station 24 along its respective feed path defined by guide roller means such as at 38 schematically shown in FIG. 1 at the glue station 24, the rollers being rotatably mounted on frame 22. Strip 34 and strip 36 respectively pass over an adhesive transfer roller of guide roller means 38 such that adhesive is applied in a form of a water emulsion by a transfer roller coating process on one surface only of each of the film strips. The adhesive is preferably thermoplastic acrylic pressure sensitive adhesive such as Rohm and Haas E-1031 which is fire retarded, e.g. with an additive known as "Firemaster 250" manufactured by Michigan Chemical Company or Mobil O Company additive "Antiblaze 19T".

As best seen in FIG. 1, film strip 34, hereinafter called the inner film strip, passes directly through an opening 42 into a drying oven 44. The other film strip 36, hereinafter called the outer film strip, passes over a pair of guide rollers 46, 46 rotatably supported on frame 22 and is likewise directed along its feed path 28 through opening 48 of oven 44. To remove the water from the emulsion, the film strips 34, 36 are then trained over a series of guide rollers, not shown, within the oven 44 which may have a maximum temperature, e.g., of about 180 F. The strip 34, 36 emerge on a downstream side of oven 44 through opening 50 and 52.

Downstream of oven 44, the inner and outer film strips 34, 36 respectively pass in the direction of arrow 54, 56 along their respective feed paths over guide rollers 58, 60 supported for free wheeling rotation on frame 62 of wrapping station 32. As best seen in FIG. 2, inner film strip 34 passes onto a cylindrical working surface 64 of mandrel 30 which is cantilever mounted on frame 62 at wrapping station 32 and supported by suitable bearing means, not shown, for free wheeling rotation. The cylindrical surface 64 of mandrel 30 serves as a working surface on which the duct core 1 is formed and is of a preselected diameter established to form the desired inside duct diameter, but is significantly shorter than the length of the duct core to be formed. If desired, mandrel 30 may have a free end 66 of reduced diameter to facilitate the completely formed duct core to pass off forwardly from the free end of mandrel 30 onto a pair of elongated bars 68, 68 serving as a run-out track extending longitudinally parallel to and below mandrel 30 (FIG. 1).

Mandrel 30 is positively driven by a drive belt 7 (FIG. 2) trained helically about mandrel 30 in overlying driving engagement with adjacent wraps of strips 34, 36. The drive belt 70 will be understood to be of conventional construction and passes over a drive roller not shown, suitably mounted on frame 62 and connected to drive components, not shown, to rotate belt 70 under the power of motor in accordance with well known techniques.

To lay strips 34, 36 and reinforcing wire 16 on mandrel 30 and to advance these strips 34, 36 and wire 1 forwardly of mandrel 30 in a controlled manner axially along its working surface 64, the inner film strip 34 is helically wrapped with its adhesive surface facing outwardly. A trailing edge 72 (FIG. 3) of each leading wrap of inner film strip 34 is overlapped by a leading edge 74 of each trailing wrap of strip 34 to establish a overlap, say, of about 0.5 inch of a strip 34 having about a 1.750 inch width with adjacent wraps of the inner film strip 34 in edge lapping relation to one another.

Reinforcing wire 16 preferably may vary, e.g., from about a 14 to 17 gauge wire respectively having a diameter of about 0.080 to 0.054 inch for use with inner film strips 34 of a width of about 1.750 inch. Reinforcing wire 16 is shown as being fed from a wire payoff stand 76 along a feed path 78 defined by a pair of overhead rollers 80, 82 rotatably mounted on uprights 84, 8 cured to frame 62 and over a lower pair of guide rollers 88, 90 supported rotation on the frame 62 to introduce the wire between the inner and outer film strips 34 and 36 to overly the overlapping edges 72, 74 inner film strip 34.

To provide a complete double-ply construction duct core 12 in accordance with this invention, outer film strip 36 is oriented with its dried adhesively coated surface on its lower face, and the leading edge 92 of each wrap of outer film strip 36 is wound over reinforcing wire 16 in centered relation thereto. The outer film strip 36 may be provided with varying widths; it has been found satisfactory to provide a strip width about 1.375 inch with overlapping at the edges of about 0.125 inch or, alternatively, the outer film strip 36 may be equal in width, e.g., to the above noted 1.750 inch dimensioning of the inner strip 34 with corresponding large overlap.

One turn of belt 70 about mandrel 30 displaces the leading edge 72, 92 of each wrap of the inner and outer film strips 34, 36 axially of mandrel 30 a distance sufficient to insure overlap of trailing edges 72, 94 with leading edges 74, 92 of the following wrap of film strips 34, 36. Accordingly during machine set up, the trailing edge 94 of the first wrap or convolution of the outer film strip 36, e.g., is located in underlying lapping relation to a leading edge 94 of the following wrap to again insure edge lapping engagement of the outer film strip wraps with each wrap being centered over reinforcing wire 16 and the underlying lapping edges 72, 74 of inner film strip 34. During operation as the duct core 12 thus formed passes under drive belt 70, the drive belt 70 further compresses each set of the lapping edges 72, 74 and 92, 94 of the two film strips 34, 36 against mandrel 30, and the pressure sensitive adhesive secures the overlapping film strips 34, 36 in a tough, strong bond with the reinforcing wiring 16 totally encased in a helically extending seam formed between the double-ply wraps of the tubular duct core 12 being formed.

During high production operation, actual lengths of the duct core 12 may be formed, say, from about 15 to about 25 feet long. Suitable means, not shown, are provided for engaging the duct core 12 to insure that each wrap of the completed duct passing beyond drive belt 70 is extended to facilitate cutting the wire 16 within its seam to divide the duct into preselected sections during manufacture. It is also to be understood that a multiplicity of completely formed wraps of duct core 12 may be passed off the free end 66 of mandrel 30 and compressed while on the run-out track 68. A cutting mechanism, not shown, is preferably employed to cut the wire on the downstream side of drive belt 70. It will be seen that the cost of the material itself is reduced by the process of this invention by eliminating any need for specialized wire coating, frequently found to be required in other conventional production techniques, since the lapping wraps of the strips 34, 36 themselves effectively encase wire 16. The resulting duct core 12 has been found to exhibit a tough, strong bond along its seam and also satisfactory shelf life. Moreover, this invention is usable with a variety of different materials of varying size as well as being flexible with respect to the type and thickness of the strip materials used so as to customize the finished duct core 12 to match the requirements of its applications, the duct core diameter ranging from about 6 inches to about 18 inches, e.g., for different applications. Thereafter, the duct core 12 may be encased within insulation, not shown, of a suitable conventional type and an outer vapor barrier may be applied in surrounding relation to the insulation to complete the duct providing both insulating and vapor barrier layers.

As will be apparent to persons skilled in the art, various modifications, adaptations and variations of the foregoing specific disclosure can be made without departing from the teachings of this invention.

I claim:

1. A method of making collapsible tubing comprising the steps of helically winding a first strip of flexible sheet material into continuous lapping wraps defining a generally tubular duct, training a length of a resilient forming member onto the outside surface of the strip in helical wraps along the outside lapping surfaces of the first strip, helically winding and securing onto the first strip a second strip of flexible sheet material in continuous lapping wraps with the inside surface of the second strip covering the outside surface of the first strip with the forming member encased in fixed relation between the first and second strips.

2. The method of claim 1 wherein the training step is effected by winding wire along the outside lapping surfaces of the first strip.

3. A method of making collapsible tubing comprising the steps of helically winding a first strip of flexible sheet material into continuous edge lapping wraps defining a generally tubular duct, training a length of a resilient forming member onto the outside surface of the strip in helical wraps, helically winding and securing onto the first strip a second strip of flexible sheet material in continuous edge lapping wraps with the inside surface of the second strip covering the outside surface of the first strip with the wraps of the first and second strips in edge lapping relation respectively with lapping edges of the first and second strips offset relative to one another in longitudinally staggered relation and the forming member encased in fixed relation between the first and second strips.

4. The method of claim 3 including the further steps of applying an adhesive coating in the form of a water emulsion onto the outside surface of the first strip and the inside surface of the second strip, and heating the coated strips to remove the water and change the adhesive coating to a dry pressure sensitive condition before winding of the strips.

5. A method of making collapsible tubing comprising the steps of helically winding a first step of polyester film of a thickness of about 0.0005 into continuous lapping wraps to effect edge lapping engagement of adjacent wraps defining a generally tubular duct, helically winding and securing onto the first strip a second strip of polyester film of a thickness of about 0.0005 inch in continuous lapping wraps to effect edge lapping engagement of adjacent wraps of the second strip with lapping edges of the first and second strips offset relative to one another in longitudinally staggered relation, and supplying a continuous length of wire in timed relation to winding movements of the first and second strips with the wire being in overlapping centered relation to lapping edges of the first strip and in underlying relation to the second strip with the wire centered between lapping edges of the second strip and encased in fixed relation between the first and second strip.

6. A method of making collapsible tubing comprising the steps of applying an adhesive coating in the form of a water emulsion onto one surface of a first strip of flexible sheet material, heating the coated first strip to remove the water and change the adhesive coating to a dry pressure sensitive condition, helically winding the first strip of flexible sheet material into continuous lapping wraps defining a generally tubular duct with said one coated surface comprising an outside surface, training a length of a resilient forming member onto the outside surface of the first strip in helical wraps, applying an adhesive coating in the form of a water emulsion onto one surface of a second strip of flexible sheet material, heating the coated second strip to remove the water and change the adhesive coating to a dry pressure sensitive condition, helically winding and securing onto the first strip the second strip of flexible sheet material in continuous lapping wraps with said one coated surface of the second strip comprising an inside surface of the second strip covering the outside surface of the first strip with the forming member securely encased in fixed relation between the first and second strips.

7. The method of claim 6 wherein the adhesive applying step is effected by transfer roller coating of a thermoplastic acrylic adhesive onto the outside and inside surfaces respectively of the first and second strips sheet material.

8. The method of claim 6 wherein the heating step performed by passing the coated strips with the adhesive applied thereto through a drying oven before winding.

9. The method of claim 8 wherein the heating step performed by passing the strips with the adhesive applied thereto through a drying oven having a maximum temperature of about 180° F.

* * * * *